United States Patent Office
2,922,171
Patented Jan. 26, 1960

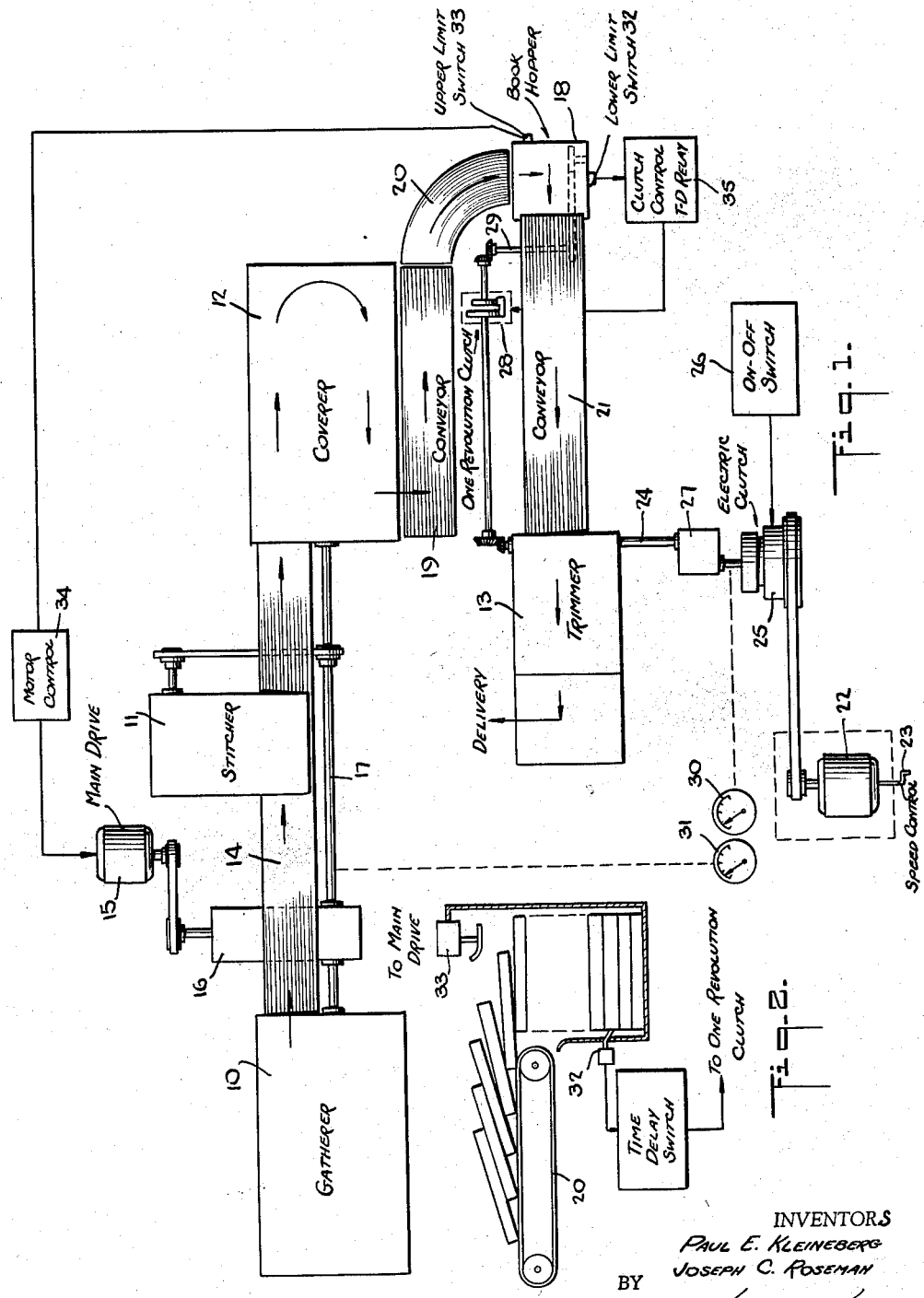

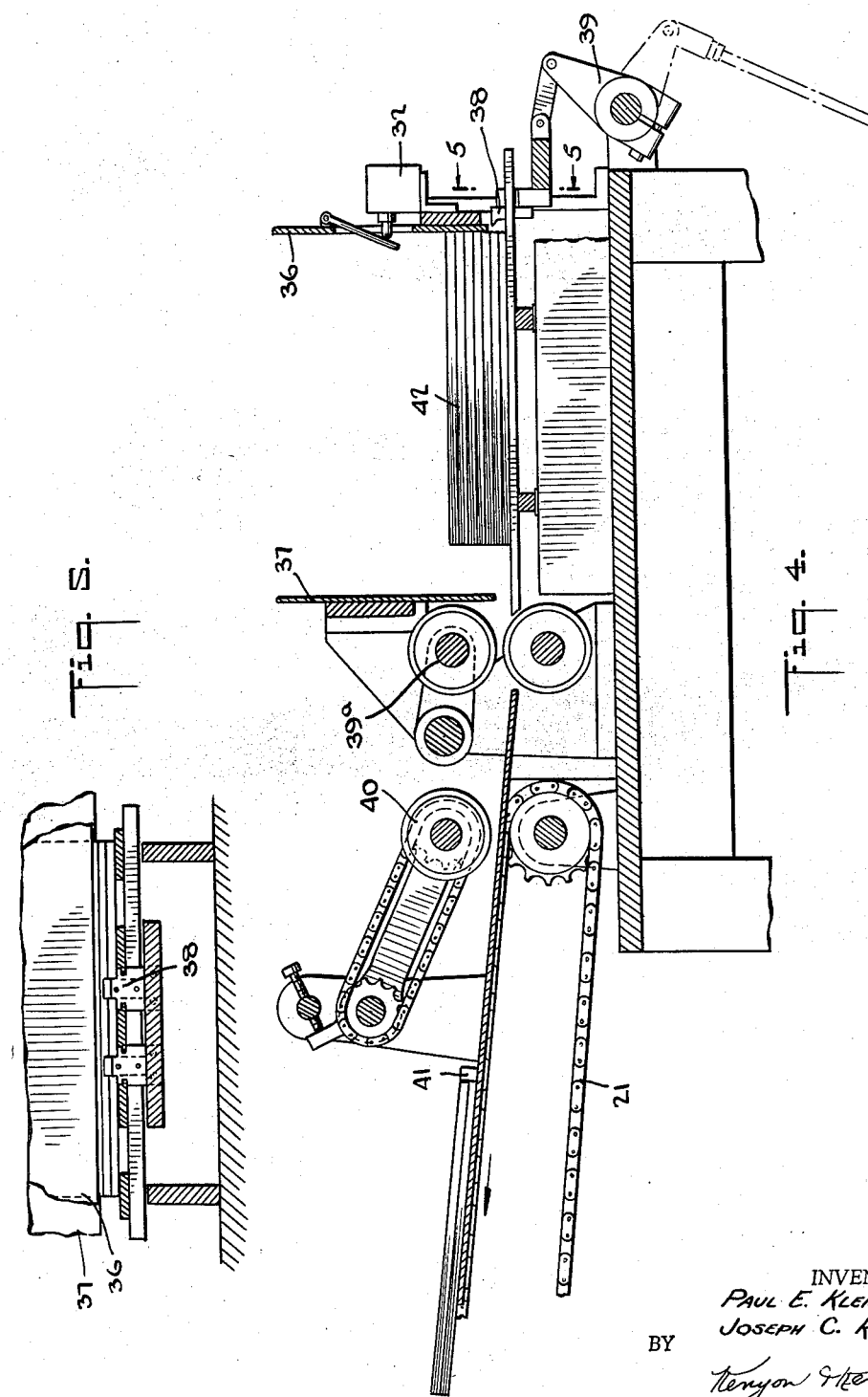

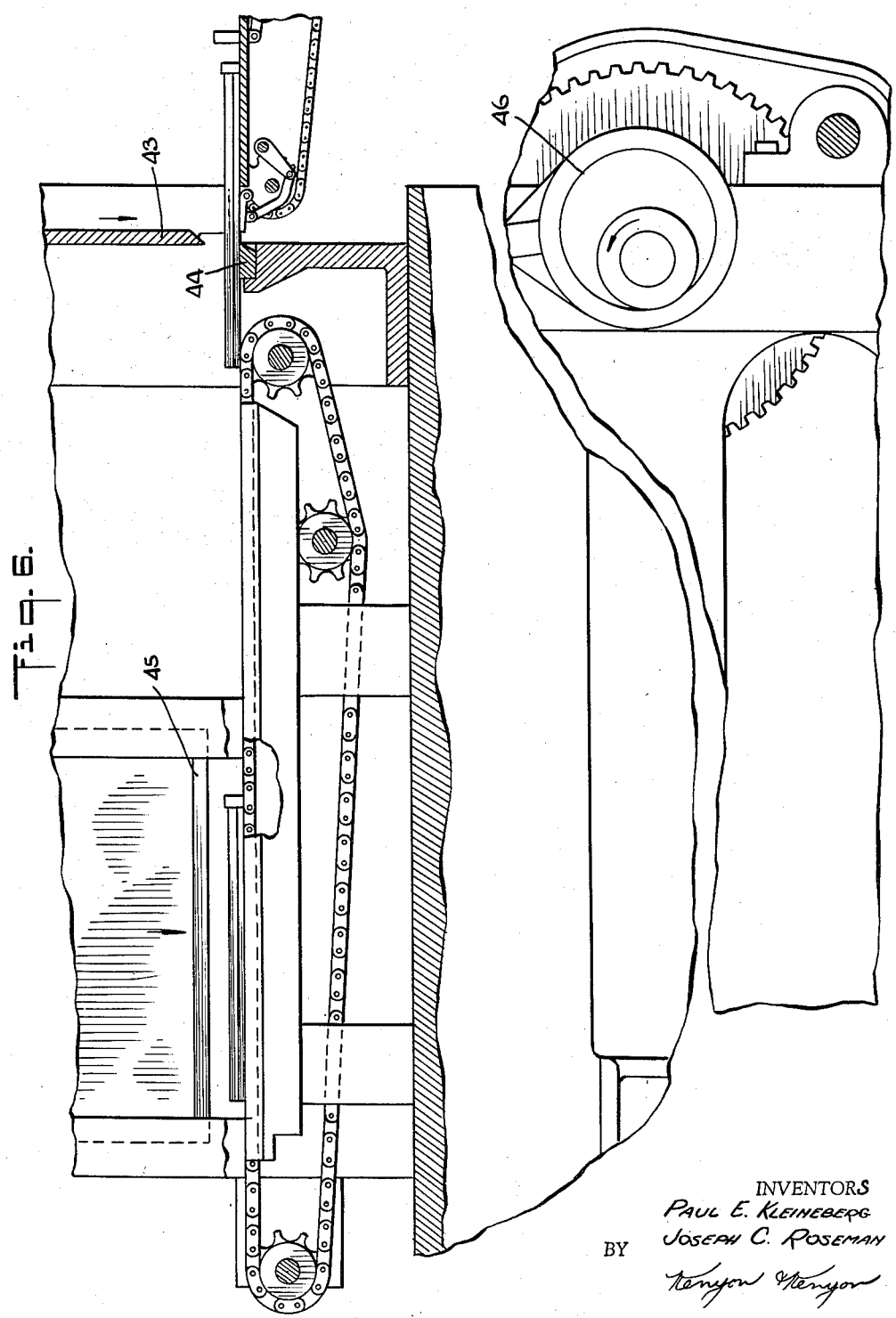

2,922,171

CONTROLLED HOPPER FEED FOR INDEPENDENTLY DRIVEN TRIMMER IN BOOKBINDING SYSTEM

Paul E. Kleineberg, Easton, and Joseph C. Roseman, Bethlehem, Pa., assignors to T. W. & C. B. Sheridan Co., New York, N.Y., a corporation of New York Application August 14, 1957, Serial No. 678,136

5 Claims. (Cl. 11—1)

The present invention relates generally to bookbinding machine systems wherein printed signatures are automatically gathered, stitched and covered and thereafter trimmed to form the finished product. More particularly, the invention pertains to an independent driving mechanism for the trimmer and the feed hopper therefor, and apparatus for controlling the operation of the hopper without stopping the trimmer.

In the manufacture of books, magazines, pamphlets and the like, the printed sheets or "signatures" are assembled in the order desired for binding. The gathering of signatures may be effected by inserting one within the other or by piling one on top of the other. The signatures so assembled in the gathering machine are then bound or stapled together in a stitching machine from which they are conveyed to a coverer. The coverer acts to spread paste to the back and to apply a cover jacket to the book. Finally the covered books are delivered through a hopper into an automatic trimmer device which serves to shear the edges of the books, the trimmer in most instances acting on two or more books at a time.

In present installations the automatic trimmer is operated from the same motor drive which powers the gatherer, stitcher and coverer assembly. Usually when adding an automatic trimmer to an existing gatherer, stitcher and coverer assembly, it is necessary to replace the motor in the assembly with a heavier duty motor and to link this motor to the trimmer drive shaft. Thus the heavy duty motor furnishes the common drive for all of the components of the system and thereby maintains all operations in proper synchronism. However, several serious drawbacks attend this arrangement.

The trimmer device includes reciprocating blades whose operation imposes an intermittent load on the drive system. This brings about a considerable degree of vibratory shock which by reason of the common power drive is transmitted to the other components of the system. The vibratory action interferes with the proper operation of the other components and tends, for example, to upset the position of the books relative to the stitching heads and to displace the cover relative to the book, thereby interfering with proper registration. Consequently, defective books are produced in the course of operation. Moreover, it is not possible to run the trimmer independently of the combination, which may sometimes be desirable for special hand feeding operations.

In the copending application entitled "Independent Driving Mechanism for Book Trimmer in Bookbinding System," Serial No. 678,414, filed August 15, 1957, there is disclosed an arrangement wherein the trimmer is maintained in synchronism with the gatherer and binder assembly, the trimmer and assembly being driven by separate power means. In the event of a choke in the feed of books into the trimmer, means are provided to stop the operation of the trimmer. Experience has shown that stopping and starting of the trimmer involves a heavy power demand and tends to create severe jars at high speed.

In view of the foregoing, it is the main object of this invention to provide in a bookbinding system, a gatherer, stitcher and coverer assembly powered from a main drive motor and a trimmer and feed hopper therefor powered independently of the main drive motor, and means to control the hopper feed without stoppage of the trimmer.

More particularly it is an object of this invention to provide a system, as above described, including means to run the trimmer and hopper combination at a slightly higher speed than the gatherer, stitcher and coverer assembly whereby the level of books in the hopper will fall periodically. In accordance with the invention, means are provided to stop the hopper without arresting the action of the trimmer when the level of books in the hopper falls below a given height.

Also an object of the invention is to provide a smoothly running and efficient bookbinding system free from undue jarring effects and adapted to bind and trim books at high speed.

Briefly stated, in a bookbinding system in accordance with the invention, a main motor is provided to power an assembly including a gatherer for the signatures and a stitcher to bind the assembled signatures, the bound books being fed to a trimmer and feed hopper combination which is driven by a separate motor unit. Means are provided to run the combination at a slightly higher speed than the assembly and to stop the hopper feed without arresting the operation of the trimmer when the book level drops to a point actuating a low level switch, said switch serving to operate a single revolution clutch in the hopper drive, whereby the hopper is disengaged from the trimmer motor drive.

For a better understanding of the invention as well as other objects and further features thereof, reference is made to the following detailed description to be read in conjunction with the accompanying drawings, wherein like components in the several views are identified by like reference numerals.

In the drawings:

Figure 1 is a schematic diagram of a system in accordance with the invention;

Figure 2 is a separate sketch of the hopper;

Figure 4 is a sectional view taken along the lines 4—4 of Figure 3;

Figure 5 is a side view of the hopper taken along the plane indicated by lines 5—5 of Figure 4; and Figure 6 is a sectional view of the trimmer device.

Figure 3:
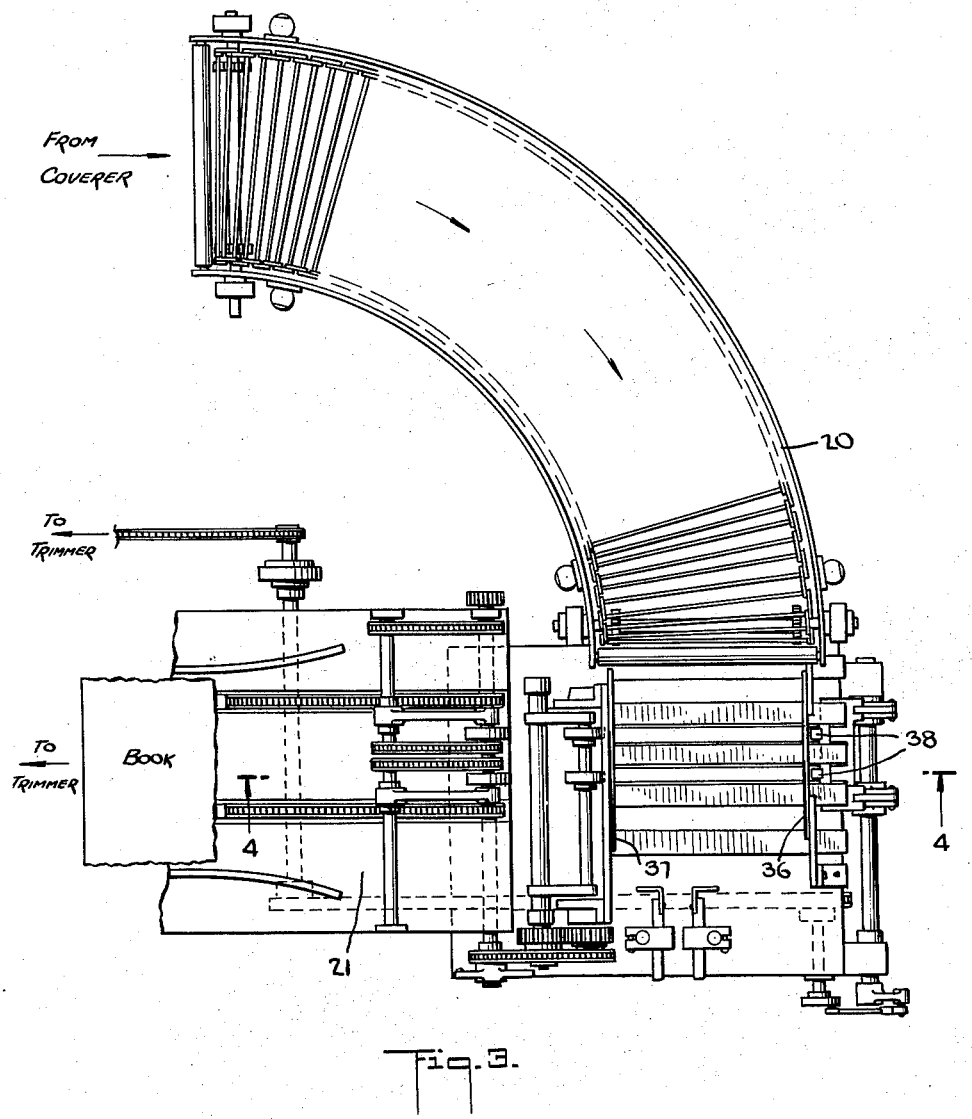
Figure 3 is a plan view showing the quarter turn conveyor feeding books into the hopper for delivery to the trimmer.

Referring now to Figures 1 and 2, the main components of a bookbinding system in accordance with the invention are a gatherer machine 10, a stitcher 11, a covering device 12 and a trimmer 13. The operation of these components is so coordinated as to assemble, bind, cover and trim books on a continuous production basis. The arrows in Figure 1 indicate the direction of book movement in the bookbinding system.

Gatherer 10 is of standard design and may, for example, be constituted by a mechanism acting to insert signatures on a continuously moving saddle, the signatures being opened and advanced by pins on a conveying chain or other conveyer means 14 to the stitcher 11 which may be a saddle stitcher. A master book caliper is preferably located between the gatherer and the stitcher to detect missing or imperfect books and to trip the stitcher mechanism so that no stitches are made. The unstitched books may then be easily separated and re-run, thereby ensuring that only perfect books enter the delivery. The stitched books are fed by the conveyor 14 to the coverer 12 which is of any conventional design adapted to spread paste on the back of the stitched books and then to apply covers thereon.

The assembly constituted by the gatherer, the stitcher and the coverer 12 is powered by a main drive motor 15 of standard design which is coupled by an endless belt to a reduction gear box 16 which turns a common drive shaft 17 for the three components of the assembly.

The book trimmer 13 may be in the form of a single or two book automatic trimmer mechanism having either three, four or five knives, such as the Sheridan A-T Trimmer or the Sheridan B-T Trimmer manufactured by the T.W. & C.B. Sheridan Co. of New York. The books are conveyed from the coverer to a book hopper 18 which acts to deliver the books to the trimmer. Books are supplied to the hopper by means of a straight-line conveyor 19 whose output feeds onto a 90° power turn conveyor 20 on which the books are fed slowly and fanned out. The 90° power turn locates the trimmer and its infeed table parallel to the coverer, thereby reducing floor space requirements considerably.

The books are fed into the hopper singly and are then taken out of the bottom of the hopper and conveyed into the trimmer by the conveyor 21. The main function of the hopper is to act as a collecting box when it is desirable to trim two books at a time. Another function of the hopper is to act as a transfer between two conveyor mechanisms that may not be running at exactly the same relative position or phase at all times, even though their speeds may be alike. The relative position and phase may change due to varying acceleration of the motors, electric clutches, etc.

The trimmer 13 and the associated conveyors including the hopper 18 are powered by a separate motor drive unit, generally designated by numeral 22, which is independent of the main drive motor 15.

The variable speed motor drive unit 22 may be of the type manufactured by the Reeves Pulley Company of Columbus, Indiana (Catalog No. M-558—April 16, 1956) utilizing the operating principle of a V-belt driving between two pairs of cone-shaped discs which are adjustable to form an infinite number of driving and driven diameters. The discs are mounted on parallel shafts, one shaft receiving power at constant speed from the motor, the other delivering power at infinitely adjustable speed to a gear reducer from which the desired speed is transmitted to the driven machine. The control in the speed may be effected manually by means of a handle 23 coupled to the speed-changing mechanism which may be in the form of a pitch adjusting screw.

The vari-speed motor drive unit 22 is coupled to the reduction gear box 27 for the drive shaft 24 of the trimmer device 13 through an electric clutch 25 which is operated by a control switch 26. Thus the unit 22 is maintained in continuous operation and to stop the trimmer, the drive unit is decoupled therefrom by means of clutch 25. The drive shaft 24 of the trimmer is coupled through a one revolution clutch 28 to the drive shaft 29 for the book hopper, whereby when the clutch 28 is engaged, both the hopper and the trimmer operate simultaneously. The speed of the trimmer is indicated by a tachometer 30 which gives a direct and continuous indication of speed in times of revolution per minute. To permit a direct comparison, a second tachometer 31 is mounted adjacent tachometer 30 and is coupled to the drive shaft 17 of the stitcher and binder assembly 10, 11, 12.

Hopper 18 is provided with a low limit switch 32 which is activated when the book level therein falls below a pre-set point, the switch then serving to de-energize the clutch 28 through a time-delay relay 35. Also provided is an upper level switch 33 which is activated when the book pile in the hopper rises to an excessive height, switch 33 then acting on the control box 34 for the main drive motor 15 to cut off same, thereby arresting the flow of books into the hopper.

In practice, the operator first starts the main drive motor 15 and, by observing tachometer 31, adjusts the speed of the assembly to bind the requisite number of books per hour. He then switches on the motor unit 22 and, by observing the tachometer 30, adjusts the speed of the trimmer-hopper combination to be just a little faster than that of the gatherer-stitcher-coverer assembly. The input of books to the hopper 18 is determined by the operating speed of the assembly, whereas the output of books therefrom is determined by the trimmer speed.

Since the hopper which is synchronized with the trimmer is running somewhat faster than the assembly, books will be withdrawn therefrom at a greater rate than the input supply, as a result of which the hopper level will fall periodically. When the level of books falls below the low limit switch 32 in the hopper, clutch 28 is automatically disengaged and the hopper mechanism will be stopped. As long as the gatherer-stitcher-coverer assembly is running, books will continue to feed into the top of the hopper and a point will be reached at which the low limit switch 32 will again close to energize the clutch 28, so that operation of the hopper is resumed and books are again fed to the trimmer.

Time delay relay 35 prevents the one revolution clutch 28 from starting the hopper mechanism for a predetermined interval so that the level of the books will be permitted to rise a few inches above the low limit switch before hopper operation is resumed. After this interval, the clutch 28 is engaged and the hopper mechanism again functions, but in time with the carrier pins on the conveyor chain on the feed table 21.

Even though the book hopper stops, the trimmer 13 continues to function in its usual manner. Any stopping or slowing down of the gatherer-stitcher-coverer assembly does not affect the trimmer. The trimmer stops only when there is a choke in the unit or at the discretion of the operator. Even then the motor 22 does not stop, but the electric clutch 25 is de-energized. Therefore, when the trimmer is started its driving motor is running at full speed. This causes a smooth action even when starting in the middle of a cut or under load.

As shown separately in Figure 2, books are fed into the top of the hopper on the quarter turn conveyor 20, the books being fanned out and advanced slowly. This slow movement minimizes choke-up and books can be controlled more readily. Moreover, easier inspection of the books is possible. If, for some reason, the trimmer motor speed decreases and the trimmer takes books from the hopper more slowly than they are fed therein, the book height in the hopper will rise to a point actuating the high limit switch 33. This will automatically bring the main drive motor 15 to a halt, thereby discontinuing the feed of books into the hopper until the trimmer has caught up with the assembly production.

Referring now to Figures 3 to 5, showing hopper 18, it will be seen that books conveyed on the 90° turn conveyor 20 are fed into the top of the hopper to form a book pile 42 therein. Hopper 18 is provided with vertical side plates 36 and 37, as well as pusher fingers 38 which are reciprocated by a mechanism 39 to remove two or more books at a time from the bottom of the pile in the hopper. The exit opening defined by plate 37 may be adjusted to permit the removal of two or more books as desired and the vertical height of the fingers may be similarly adjusted.

Books ejected from hopper 18 pass under rollers 39a and 40 onto the continuous conveyor 21 for the hopper which is provided with spaced carrier pins 41 serving to push the books forward into the trimmer. Trimmer 13, as shown in Figure 6, includes a first cutting stage provided with a reciprocating blade 43 acting against a fixed bottom blade 44 to trim the front edge. In the second stage the head and tail of the books are trimmed by a similar shear action, one reciprocating blade 45 being shown in the figure. Reciprocation of the blades is effected by a suitable eccentric mechanism 46 operated from the drive shaft.

While there has been shown what is considered to be a preferred embodiment of the invention, it will be manifest that many changes and modifications may be made therein without departing from the essential spirit of the invention. It is intended, therefore, in the annexed claims to cover all such changes and modifications as fall within the true scope of the invention.

What is claimed is:

1. A bookbinding system comprising an assembly including a gatherer for signatures, a stitcher for binding the signatures to form books and a coverer therefor, a machine combination of an automatic trimmer for said covered books and a hopper for feeding books into said trimmer, a main drive motor to power said assembly, a variable speed motor drive unit for powering said combination, means to compare the speed of said assembly with that of said combination whereby said combination may be run slightly faster than said assembly, a low level switch in said hopper, and means to decouple said hopper from said drive unit when books in said hopper fall below said switch.

2. A bookbinding system comprising an assembly including a gatherer for signatures, a stitcher for binding the signatures to form books and a coverer therefor, a combination of an automatic trimmer for said covered books and a hopper for feeding books into said trimmer, a main drive motor to power said assembly, a variable speed motor drive unit for powering said combination, tachometer means to compare the speed of said assembly with that of said combination whereby said combination may be run slightly faster than said assembly, a low level switch in said hopper, means to decouple said hopper from said drive unit when books in said hopper fall below said switch, a high level switch in said hopper, and means to cut-off said main motor when said books rise to the level of said high level switch.

3. A bookbinding system comprising an assembly including a gatherer for signatures and a stitcher for binding the signatures to form books, a combination of an automatic trimmer for said books and a hopper for feeding said books therein, a main drive motor to power said assembly, a variable speed motor unit to power said combination, means to compare the speed of said main drive motor with said variable speed motor unit to effect an adjustment of said unit causing said combination to run at a slightly higher speed than said assembly, a one revolution clutch interposed between said hopper and said drive unit, and a low level switch in said hopper operatively connected to said clutch to disengage same when the books in said hopper fall below a desired level.

4. Apparatus as set forth in claim 3, including a time delay relay actuated by said switch for controlling said clutch to delay the re-engagement of said clutch until the books rise to a given point above the level of said switch.

5. A bookbinding system comprising an assembly including a gatherer for signatures and a stitcher for binding the signatures to form books, a combination of an automatic trimmer and a hopper for feeding books therein, a main drive motor to power said assembly, a variable speed motor unit to power said trimmer, a first clutch for coupling said motor unit to said trimmer to drive same, a second clutch for coupling said trimmer to said hopper to drive same, means to compare the speed of said main drive motor with said variable speed motor unit to effect an adjustment of said unit causing said combination to run at a slightly higher speed than said assembly, a low level switch in said hopper, a time delay relay activated by said switch to operate said second clutch, and a high level switch in said hopper to cut off said main motor.

References Cited in the file of this patent

UNITED STATES PATENTS

| | | |
|---|---|---|
| 2,277,879 | Ness et al. | Mar. 31, 1942 |
| 2,381,505 | Lindholm | Aug. 7, 1945 |